United States Patent
Freedman

(10) Patent No.: US 11,579,286 B2
(45) Date of Patent: Feb. 14, 2023

(54) NAVIGATION AND LOCALIZATION USING SURFACE-PENETRATING RADAR AND DEEP LEARNING

(71) Applicant: Sanford Freedman, Chelmsford, MA (US)

(72) Inventor: Sanford Freedman, Chelmsford, MA (US)

(73) Assignee: WaveSense, Inc., Somerville, MA (US)

( * ) Notice: Subject to any disclaimer, the term of this patent is extended or adjusted under 35 U.S.C. 154(b) by 74 days.

(21) Appl. No.: 17/020,192

(22) Filed: Sep. 14, 2020

(65) Prior Publication Data

US 2021/0080565 A1 Mar. 18, 2021

Related U.S. Application Data

(60) Provisional application No. 62/900,098, filed on Sep. 13, 2019.

(51) Int. Cl.
| | | |
|---|---|---|
| *G01S 13/88* | (2006.01) |
| *G01S 13/89* | (2006.01) |
| *G01S 7/41* | (2006.01) |
| *G01S 13/931* | (2020.01) |

(52) U.S. Cl.
CPC ............ *G01S 13/885* (2013.01); *G01S 7/417* (2013.01); *G01S 13/89* (2013.01); *G01S 13/931* (2013.01); *G01S 2013/9322* (2020.01); *G01S 2013/9327* (2020.01)

(58) Field of Classification Search
CPC ........ G01S 7/417; G01S 13/88; G01S 13/885; G01S 13/89; G01S 13/931
See application file for complete search history.

(56) References Cited

U.S. PATENT DOCUMENTS

| | | | | |
|---|---|---|---|---|
| 6,453,223 B1* | 9/2002 | Kelly | ................... | G05D 1/0272 |
| | | | | 701/28 |
| 7,191,056 B2* | 3/2007 | Costello | .................. | F41G 7/343 |
| | | | | 701/438 |

(Continued)

FOREIGN PATENT DOCUMENTS

| | | |
|---|---|---|
| DE | 102017215646 A1 | 3/2014 |
| DE | 102015209101 A1 | 11/2016 |

OTHER PUBLICATIONS

International Preliminary Report on Patentability with Written Opinion of corresponding International Patent Application No. PCT/US20/50699 dated Mar. 15, 2022, 5 pages.

(Continued)

*Primary Examiner* — Peter M Bythrow
(74) *Attorney, Agent, or Firm* — Morgan, Lewis & Bockius, LLP

(57) ABSTRACT

Deep learning to improve or gauge the performance of a surface-penetrating radar (SPR) system for localization or navigation. A vehicle may employ a terrain monitoring system including SPR for obtaining SPR signals as the vehicle travels along a route. An on-board computer including a processor and electronically stored instructions, executable by the processor, may analyze the acquired SPR images and computationally identify subsurface structures therein by using the acquired image as input to a predictor that has been computationally trained to identify subsurface structures in SPR images.

11 Claims, 3 Drawing Sheets

(56) References Cited

U.S. PATENT DOCUMENTS

| | | | | |
|---|---|---|---|---|
| 8,306,747 B1* | 11/2012 | Gagarin | .................. | G01C 7/04 701/514 |
| 8,949,024 B2* | 2/2015 | Stanley | .................. | G01C 21/30 340/995.22 |
| 10,444,347 B2* | 10/2019 | Bialer | .................... | G01S 13/06 |
| 10,663,579 B2* | 5/2020 | Stanley | ................ | G01S 13/951 |
| 10,725,171 B2* | 7/2020 | Stanley | .............. | B60W 40/068 |
| 10,935,655 B2* | 3/2021 | Stanley | ................. | G01V 8/005 |
| 11,079,487 B2* | 8/2021 | Reed | .................. | G05D 1/0257 |
| 11,087,494 B1* | 8/2021 | Srinivasan | ........... | G06V 20/584 |
| 11,199,413 B2* | 12/2021 | Weissman | ........... | G05D 1/0088 |
| 2010/0026555 A1* | 2/2010 | Whittaker | ............ | G05D 1/0278 382/224 |
| 2010/0052971 A1* | 3/2010 | Amarillas | ............. | G01S 13/885 342/22 |
| 2012/0026329 A1* | 2/2012 | Vorobiev | .............. | G01C 21/12 348/148 |
| 2014/0121964 A1* | 5/2014 | Stanley | ............... | G05D 1/0257 701/514 |
| 2018/0217251 A1* | 8/2018 | Stanley | .................. | G01S 13/89 |
| 2020/0111011 A1* | 4/2020 | Viswanathan | ....... | G01C 21/005 |
| 2020/0133298 A1* | 4/2020 | Fowler | ................... | G01C 21/32 |
| 2020/0150235 A1* | 5/2020 | Beijbom | ................. | G01S 7/4802 |
| 2020/0257301 A1* | 8/2020 | Weiser | .................... | G06N 3/02 |
| 2020/0293064 A1* | 9/2020 | Wu | ....................... | G06V 20/597 |
| 2020/0333798 A1* | 10/2020 | Losh | ....................... | G01S 13/89 |
| 2021/0033404 A1* | 2/2021 | Lawlor | ............. | G01C 21/3815 |

OTHER PUBLICATIONS

Dinh Kien, et al., "An algorithm for automatic localization and detection of rebars from GPR date of concrete bridge decks", Automation in Construction, Elsevier, Amsterdam, NL., vol. 89, pp. 292-298, dated Feb. 22, 2018.

Kouros, Georgics, et al, "3d Underground Mapping with a Mobile Robot and a GPR Antenna", 2018 IEEE/RSJ International Conference on Intelligent Robots and Systems (IROS), pp. 3218-3224, dated Oct. 1, 2018.

International Search Report, PCT Application No. PCT/US2020/050699, dated Oct. 10, 2022, 15 pages.

* cited by examiner

NAVIGATION AND LOCALIZATION USING SURFACE-PENETRATING RADAR AND DEEP LEARNING

CROSS-REFERENCE TO RELATED APPLICATION

This application claims priority to and the benefit of, and incorporates herein by reference in its entirety, U.S. Provisional Patent Application No. 62/900,098, filed on Sep. 13, 2019.

FIELD OF THE INVENTION

The present invention relates, generally, to vehicle localization and navigation, and more generally to improvements in accuracy and system monitoring using deep learning techniques.

BACKGROUND

Surface-penetrating radar (SPR) systems have been used for navigation and vehicle localization; see, e.g., U.S. Pat. No. 8,949,024, the entire disclosure of which is incorporated by reference herein. SPR can be used in environments, such as cities, where multipath or shadowing degrades GPS accuracy, or as an alternative to optical sensing approaches that cannot tolerate darkness or changing scene illumination or whose performance can be adversely affected by variations in weather conditions.

In particular, SPR can be used to acquire scans containing surface and subsurface features as a vehicle traverses terrain, and the acquired data scans may be compared to reference scan data that was previously acquired within the same environment in order to localize vehicle position within the environment. If the reference scan data has been labeled with geographic location information, a vehicle's absolute location can thereby be determined.

The scan data comparison may be a registration process based on, for example, correlation; see, e.g., U.S. Pat. No. 8,786,485, the entire disclosure of which is incorporated by reference herein. Although SPR localization based on reference scan data overcomes the above-noted limitations of traditional technologies, SPR sensors are not foolproof and the registration process inevitably exhibits some degree of error. For example, errors may arise from ambiguous ground conditions, SPR sensor aging or malfunction, the speed of the vehicle, or variations in ambient conditions such as wind speed or temperature.

Accordingly, there is a need for measures that improve SPR-based localization system accuracy, minimize the occurrence of error states, and estimate the reliability of real-time localization estimates.

SUMMARY

Embodiments of the present invention use deep learning to improve or gauge the performance of an SPR system for localization or navigation. The term "deep learning" refers to machine-learning algorithms that use multiple layers to progressively extract higher-level features from raw images. Deep learning generally involves neural networks, which process information in a manner similar to the human brain. The network is composed of a large number of highly interconnected processing elements (neurons) working in parallel to solve a specific problem. Neural networks learn by example; they must be properly trained with carefully collected and curated training examples to ensure high levels of performance, reduce training time, and minimize system bias.

Convolutional neural networks (CNNs) are often used to classify images or identify (and classify) objects pictured in an image scene. A self-driving vehicle application, for example, may employ a CNN in a computer-vision module to identify traffic signs, cyclists or pedestrians in the vehicle's path. The CNN extracts features from an input image using convolution, which preserves the spatial relationship among pixels but facilitates learning the image features using small squares of input data. Neural networks learn by example, so images may be labeled as containing or not containing a feature of interest. (Autoencoders can learn without labeling.) The examples are selected carefully, and usually must be large in number, if the system is to perform reliably and efficiently.

Accordingly, in a first aspect, the invention pertains to a method of detecting and identifying subsurface structures. In various embodiments, the method comprising the steps of acquiring an SPR image, and computationally identifying a subsurface structure in the acquired image by using the acquired image as input to a predictor that has been computationally trained to identify subsurface structures in SPR images.

In some embodiments, the method also includes acquiring additional SPR images during traversal of a route; recognizing, in the SPR images by the predictor, subsurface features that the predictor has been trained to recognize; and associating the recognized features in the images with terrestrial coordinates corresponding to times when the images were obtained and, based thereon, producing an electronic map of subsurface structures corresponding to the recognized features.

In various embodiments, the method further comprising the steps of acquiring additional SPR images during traversal of a route by a vehicle; recognizing, in the SPR images by the predictor, subsurface features that the predictor has been trained to recognize; associating the recognized subsurface features with terrestrial coordinates corresponding thereto; and navigating the vehicle based at least in part on the recognized subsurface features and their terrestrial coordinates.

In another aspect, the invention relates to a system for detecting and identifying subsurface structures. In various embodiments, the system comprises an SPR system for acquiring SPR images, and a computer including a processor and electronically stored instructions, executable by the processor, for analyzing the acquired SPR images and computationally identifying subsurface structures therein by using the acquired image as input to a predictor that has been computationally trained to identify subsurface structures in SPR images.

In either of the foregoing aspects, the predictor may be a neural network, e.g., a convolutional neural network or a recurrent neural network.

Still another aspect of the invention pertains to vehicle comprising, in various embodiments, an SPR system for acquiring SPR images during vehicle travel, and a computer including a processor and electronically stored instructions, executable by the processor, for analyzing the acquired SPR images and computationally identifying subsurface structures therein by using the acquired image as input to a predictor that has been computationally trained to identify subsurface structures in SPR images.

In various embodiments, the computer is configured to associate the recognized features in the images with terrestrial coordinates corresponding to times when the images were obtained and, based thereon, produce an electronic map of subsurface structures corresponding to the recognized features. Alternatively or in addition, the computer may be configured to associate the recognized features in the images with terrestrial coordinates corresponding thereto, and to navigate the vehicle based at least in part on the recognized subsurface features and their terrestrial coordinates.

As used herein, the term "substantially" means ±10% by a tissue volume, and in some embodiments, ±5% by a tissue volume. "Clinically significant" means having an undesired (and sometimes the lack of a desired) effect on tissue that is considered significant by clinicians, e.g., triggering the onset of damage thereto. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing and the following detailed description will be more readily understood when taken in conjunction with the drawings, in which.

DETAILED DESCRIPTION

Figure 1A:
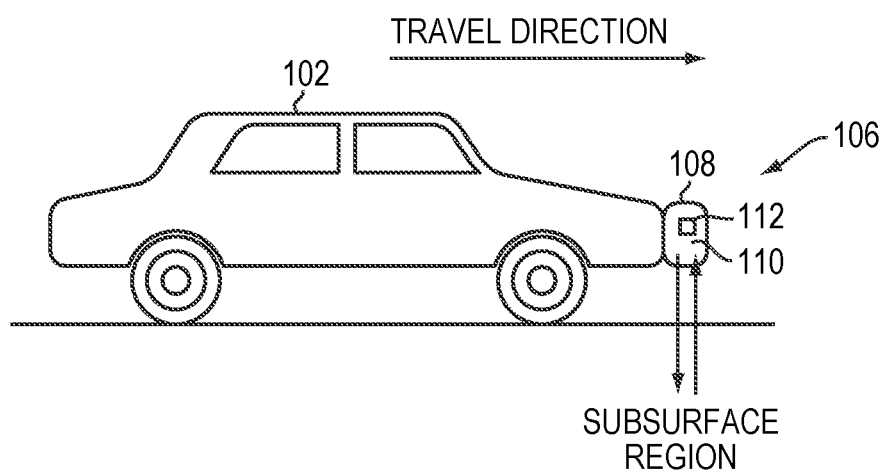
FIG. 1A schematically illustrates an exemplary traveling vehicle including a terrain monitoring system in accordance with embodiments of the invention.
Figure 1B:
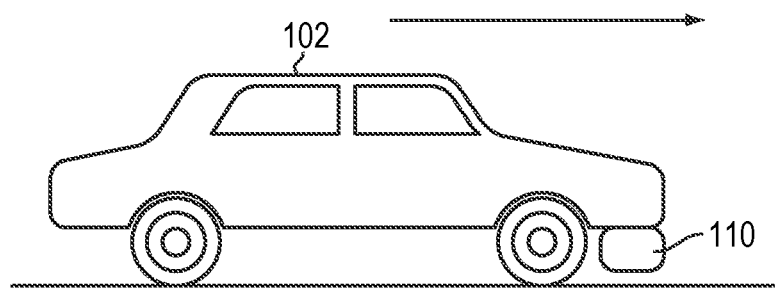
FIG. 1B schematically illustrates an alternative configuration in which the antenna of the terrain monitoring system is closer to or in contact with the surface of the road.

Refer first to FIG. 1A, which depicts an exemplary vehicle 102 traveling on a predefined route 104; the vehicle 102 is provided with a terrain-monitoring system 106 for vehicle navigation in accordance herewith. In various embodiments, the terrain monitoring system 106 includes an SPR navigation and control system 108 having a ground-penetrating radar (GPR) antenna array 110 fixed to the front (or any suitable portion) of the vehicle 102. The GPR antenna array 110 is generally oriented parallel to the ground surface and extends perpendicular to the direction of travel. In an alternative configuration, the GPR antenna array 110 is closer to or in contact with the surface of the road (FIG. 1B). In one embodiment, the GPR antenna array 110 includes a linear configuration of spatially-invariant antenna elements for transmitting GPR signals to the road; the GPR signals may propagate through the road surface into the subsurface region and be reflected in an upward direction. The reflected GPR signals can be detected by the receiving antenna elements in the GPR antenna array 110. In various embodiments, the detected GPR signals are then processed and analyzed in order to generate one or more SPR images (e.g., GPR images) of the subsurface region along the track of the vehicle 102. If the SPR antenna array 110 is not in contact with the surface, the strongest return signal received may be the reflection caused by the road surface. Thus, the SPR images may include surface data, i.e., data for the interface of the subsurface region with air or the local environment. Suitable GPR antenna configurations and systems for processing GPR signals are described, for example, in U.S. Pat. No. 8,949,024, the entire disclosure of which is hereby incorporated by reference.

For navigation, the SPR images are compared to SPR reference images that were previously acquired and stored for subsurface regions that at least partially overlap the subsurface regions for the defined route. The image comparison may be a registration process based on, for example, correlation as described in the '485 patent mentioned above. The location of the vehicle 102 and/or the terrain conditions of the route 104 can then be determined based on the comparison. In some embodiments, the detected GPR signals are combined with other real-time information, such as the weather conditions, electro-optical (EO) imagery, vehicle health monitoring using one or more sensors employed in the vehicle 102, and any suitable inputs, to estimate the terrain conditions of the route 104.

Figure 2:
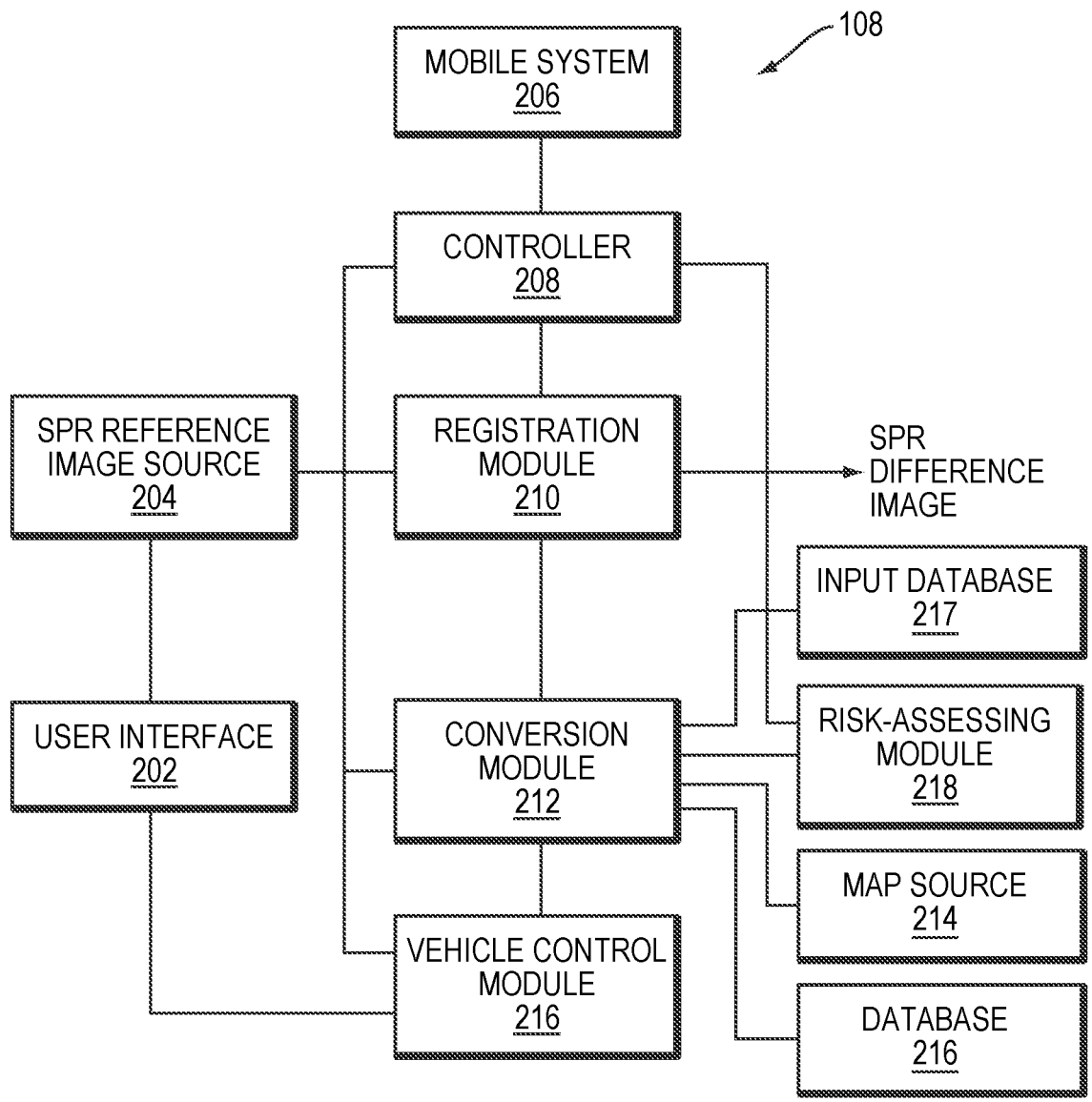
FIG. 2 schematically depicts an exemplary terrain monitoring system in accordance with embodiments of the invention.

FIG. 2 depicts an exemplary navigation and control system (e.g., the SPR system 108) implemented in a vehicle 102 for navigating travel based on SPR images. The SPR system 108 may include a user interface 202 through which a user can enter data to define the route or select a predefined route. SPR images are retrieved from an SPR reference image source 204 according to the route. For example, the SPR reference image source 204 may be a local mass-storage device such as a Flash drive or hard disk; alternatively or in addition, the SPR reference image source 204 may be cloud-based (i.e., supported and maintained on a web server) and accessed remotely based on a current location determined by GPS. For example, a local data store may contain SPR reference images corresponding to the vicinity of the vehicle's current location, with periodic updates being retrieved to refresh the data as the vehicle travels.

The SPR system 108 also includes a mobile SPR system ("Mobile System") 206 having an SPR antenna array 110. The transmit operation of the mobile SPR system 206 is controlled by a controller (e.g., a processor) 208 that also receives the return SPR signals detected by the SPR antenna array 110. The controller 208 generates SPR images of the subsurface region below the road surface and/or the road surface underneath the SPR antenna array 110.

The SPR image includes features representative of structure and objects within the subsurface region and/or on the road surface, such as rocks, roots, boulders, pipes, voids and soil layering, and other features indicative of variations in the soil or material properties in the subsurface/surface region. In various embodiments, a registration module 210 compares the SPR images provided by the controller 208 to the SPR images retrieved from the SPR reference image source 204 to locate the vehicle 102 (e.g., by determining the offset of the vehicle with respect to the closest point on the route). In various embodiments, the locational information (e.g., offset data, or positional error data) determined in the registration process is provided to a conversion module 212 that creates a location map for navigating the vehicle 102.

For example, the conversion module 212 may generate GPS data corrected for the vehicle positional deviation from the route.

Alternatively, the conversion module 212 may retrieve an existing map from a map source 214 (e.g., other navigation systems, such as GPS, or a mapping service), and then localize the obtained locational information to the existing map. In one embodiment, the location map of the predefined route is stored in a database 216 in system memory and/or a storage device accessible to the controller 208. Additionally or alternatively, the location data for the vehicle 104 may be used in combination with the data provided by an existing map (e.g., a map provided by GOOGLE MAPS) and/or one or more other sensors or navigation systems, such as an inertial navigation system (INS), a GPS system, a sound navigation and ranging (SONAR) system, a LIDAR system, a camera, an inertial measurement unit (IMU) and an auxiliary radar system, one or more vehicular dead-reckoning sensors (based on, e.g., steering angle and wheel odometry), and/or suspension sensors to guide the vehicle 102. For example, the controller 112 may localize the obtained SPR information to an existing map generated using GPS. Approaches for utilizing the SPR system for vehicle navigation and localization are described in, for example, the '024 patent mentioned above.

Figure 3:
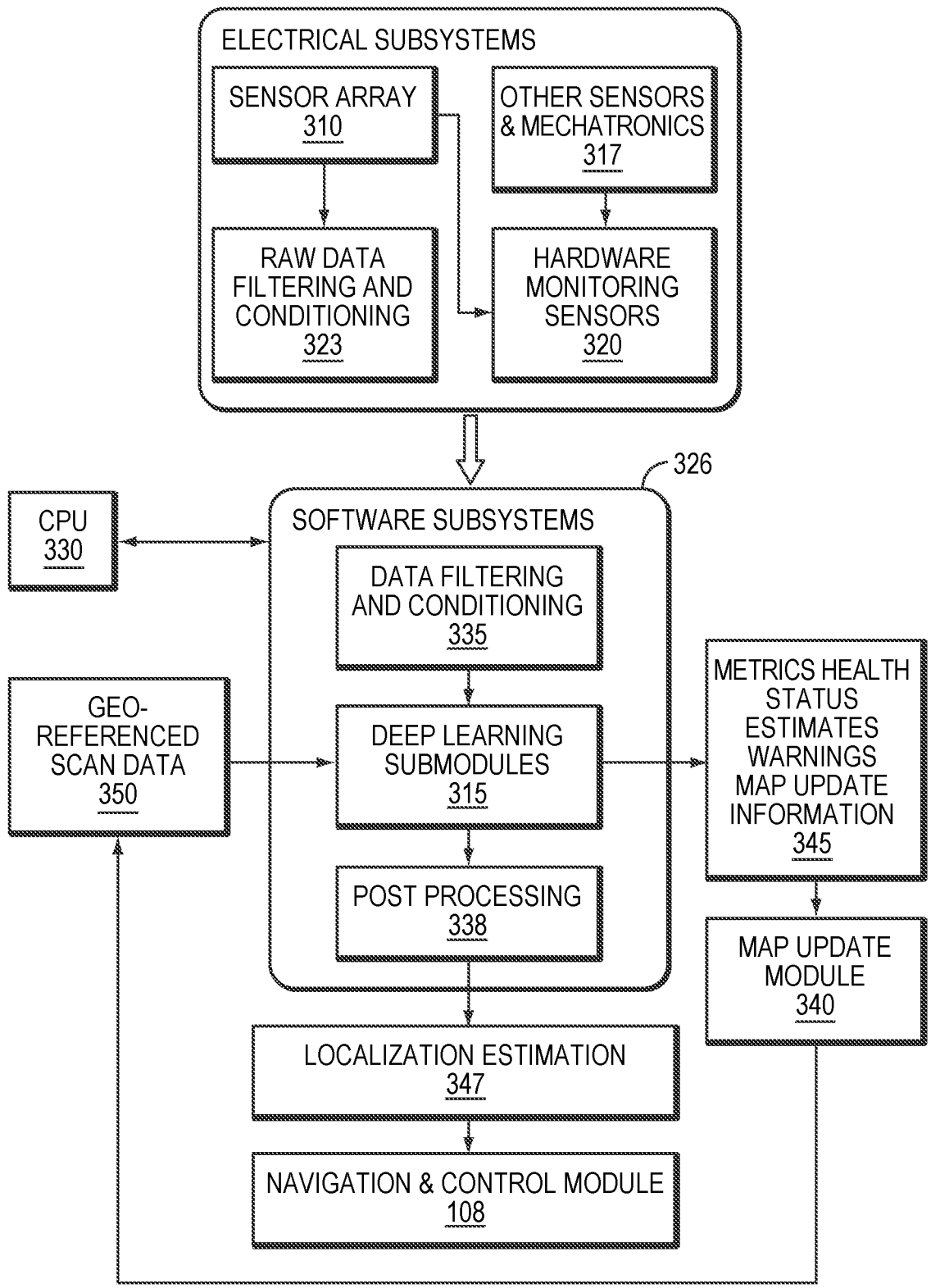
FIG. 3 schematically depicts an exemplary architecture in which a CNN or other form of deep learning is integrated with an SPR system.

An exemplary architecture integrating deep learning with an SPR navigation and control module 108 is illustrated in FIG. 3. As noted above, the system may include various sensors 310 deployed within the associated vehicle. These include SPR sensors but may also include sensors for identifying conditions relevant to the operation of one or more deep learning modules 315, as described below. The sensors 310 may also detect external conditions that can affect system performance and accuracy, and trigger mitigation strategies. For example, as described in U.S. Ser. No. 16/929,437, filed on Jul. 15, 2020 and hereby incorporated by reference in its entirety, the sensors 310 may detect dangerous terrain conditions (in conjunction with SPR measurement of below-surface features, which may also trigger danger warnings). In response, the system 108 may update the map database 216 accordingly and, in some implementations, issue a warning to local authorities. Sensors may also capture conditions relevant to the reliability of the location estimation. For example, additional sensors 317 may sense ambient conditions (e.g., wind speed and/or temperature), and hardware-monitoring sensors may sense vehicle performance parameters (e.g., speed) and/or vehicle health parameters (e.g., tire pressure and suspension performance) and/or SPR sensor parameters (e.g., sensor health or other performance metrics). Sensor data may be filtered and conditioned by appropriate hardware and/or software modules 323 as is conventional in the art.

A plurality of software subsystems, implemented as instructions stored in a computer memory 326, are executed by a conventional central processing unit (CPU) 330. The CPU 330 may be dedicated to the deep learning functions described below or may also operate the controller 208 (see FIG. 2). An operating system (such as, e.g., MICROSOFT WINDOWS, UNIX, LINUX, iOS, or ANDROID) provides low-level system functions, such as file management, resource allocation, and routing of messages from and to hardware devices and the software subsystems.

A filtering and conditioning module 335 appropriate to a deep learning submodule, such as a CNN, is also implemented as a software subsystem. For example, if one of the submodules 315 is a CNN, SPR images may be preprocessed by resizing to the input size of the CNN, denoising, edge smoothing, sharpening, etc. Depending on the chosen deep learning submodule(s) 315, generated output may be postprocessed by a postprocessing module 338 for localization and to generate metrics such as health status estimates, warnings, and map update information. Postprocessing refers to operations to format and adapt the outputs from the deep learning submodule(s) 315 into formats and values usable for localization estimation. Postprocessing may include any statistical analysis required to merge the outputs of individual deep learning modules into a single stream of values usable by downstream processing (for example, averaging the outputs of multiple deep learning modules), changing data types so outputs can be used in file formats, network protocols, and APIs required by downstream processing. Additionally, the postprocessing may include traditional, non-deep learning algorithms required to convert the deep-learning module outputs into location estimates, for example, to convert a probability density function over SPR images into a probability density function over the geographic locations associated with those SPR images.

More generally, localization may involve adjustment to a predicted vehicle location on a map or to the map itself via a map update module 340, which alters a map from the map database 216 based on localization estimates produced by the deep learning submodule(s) 315. Health status metrics may include estimated time to repair, estimated time to failure of both individual components and the system as a whole, accuracy estimates, estimated damage levels of physical sensor components, estimates of external interference, and similar indicators of system performance, durability, and reliability. Metrics may take the form of confidence values of the entire system and/or individual submodules, as well as estimated accuracy and error distributions and estimated system latencies. The generated metrics may also facilitate automatic system-parameter tuning, e.g., gain adjustment. These operations may be handled by a metrics module 345.

In one embodiment, the deep learning submodule(s) 315 include a CNN that analyzes incoming SPR images (e.g., sampled periodically from the GPR antenna array 110) and computes a match probability to one or more registration images. Alternatively, SPR images may be analyzed conventionally, as described in the '024 patent, to locate one or more best-matching images and associated match probabilities. The match probabilities may be adjusted based on input received from sensors that capture conditions relevant to the reliability of the location estimation and processed by the deep learning submodules 315. This data may be handled by a different submodule 315 (e.g., another neural network) and may include or consist of ambient conditions (e.g., wind speed and/or temperature), vehicle parameters (e.g., speed), and/or SPR sensor parameters (e.g., sensor health or other performance metrics)—any data that bear on the reliability of the generated SPR data scan and/or the match probability to a reference image, and therefore the localization accuracy, expressed, for example, as an error estimate. The relationship between the data and the SPR image may be quite complex and the most relevant features difficult to detect and use as a basis for localization, which is why the deep learning system is employed. The deep learning submodules 315 take as input the sensor data and the raw SPR images and output a predicted location or data usable by a location estimation module 347, which may estimate a location using image registration as described above and in the '024 patent.

The manner in which the deep learning submodule is trained depends on its architecture, input data format, and goals. In general, a wide array of input data is collected and geo-referenced with truth information (i.e., known locations) 350. The localization error of the system is evaluated with a cost function and back-propagated to tune system weights. A deep learning system may also be trained to recognize subsurface features whose details or conformations may vary. As a conceptual example, a utility conduit may vary not only in diameter but in its orientation relative to the SPR sensor. Representing all possible SPR images corresponding to the conduit analytically may be impractical or impossible, but by training a CNN (or, in cases where identification requires sequential analysis of multiple SPR images, a recurrent neural network or RNN), it is possible to recognize the conduit in arbitrary orientations with high accuracy. Accordingly, the neural network may be used to recognize and catalog, along a route subsurface, features that it has been trained to recognize—associating these with latitude/longitude coordinates obtained as described above or using GPS to produce a map of fixed, permanent or semi-permanent subsurface structures prior to road or infrastructure construction.

Alternatively, feature recognition can be used for navigational purposes. Knowing that a pipe of a certain size is located at particular GPS coordinates, for example, may be sufficient to fix the location of a moving vehicle based on generic detection of a pipe in the vicinity of the known location. Accuracy can be improved if multiple features a known distance apart are detected. Subsurface features may also represent hazards or can suggest the need for prophylactic measures to avoid hazards. For example, subsurface regions with high water content under a roadway can lead to potholes. If detected and corrected before a cycle of freezing and thawing, dangerous road conditions can be avoided and the cost of mitigation reduced.

In some embodiments, the deep learning module(s) 315 are hosted locally on computational equipment within a vehicle, and may be updated by a server from time to time as further centralized training improves the neural network's performance. In other embodiments, the latest neural network model may be stored remotely and accessed by the vehicle via a wireless connection, e.g., over the internet. Map updating and maintenance may also be performed "in the cloud."

The deep learning module(s) 315 may be implemented without undue experimentation using commonly available libraries. Caffe, CUDA, PyTorch, Theano, Keras and TensorFlow are suitable neural network platforms (and may be cloud-based or local to an implemented system in accordance with design preferences). The input to a neural network may be a vector of input values (a "feature" vector), e.g., the readings of an SPR scan and system health information.

The controller 208 may include one or more modules implemented in hardware, software, or a combination of both. For embodiments in which the functions are provided as one or more software programs, the programs may be written in any of a number of high level languages such as PYTHON, FORTRAN, PASCAL, JAVA, C, C++, C#, BASIC, various scripting languages, and/or HTML. Additionally, the software can be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

The CPU 330 that executes commands and instructions may be a general-purpose computer, but may utilize any of a wide variety of other technologies including a special-purpose computer, a microcomputer, microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of detecting and identifying subsurface structures, the method comprising the steps of:
 acquiring a plurality of surface-penetrating radar (SPR) images during traversal of a route;
 computationally identifying subsurface structures in the acquired images by using the acquired images as input to a predictor that has been computationally trained to identify subsurface structures in SPR images; and
 associating the identified features in the images with terrestrial coordinates corresponding to geographic locations of the identified features and, based thereon, producing a terrestrial map of subsurface structures corresponding to the identified features.

2. The method of claim 1, wherein the predictor is a neural network.

3. The method of claim 1, wherein the neural network is a convolutional neural network.

4. The method of claim 1, wherein the neural network is a recurrent neural network.

5. The method of claim 1, further comprising the steps of:
 acquiring additional SPR images during traversal of a route by a vehicle;
 recognizing, in the SPR images by the predictor, subsurface features that the predictor has been trained to recognize; and
 navigating the vehicle based at least in part on the recognized subsurface features and their terrestrial coordinates in the terrestrial map.

6. A system for detecting and identifying subsurface structures, the system comprising:
 a surface-penetrating radar (SPR) system for acquiring SPR images; and
 a computer including a processor and electronically stored instructions, executable by the processor, for (i) analyzing the acquired SPR images and computationally identifying subsurface structures therein by using the acquired image as input to a predictor that has been computationally trained to identify subsurface structures in SPR images and (ii) associating the identified features in the images with terrestrial coordinates corresponding to geographic locations of the identified features and, based thereon, producing a terrestrial map of subsurface structures corresponding to the recognized features.

7. The system of claim 6, wherein the predictor is a neural network.

8. The system of claim 6, wherein the neural network is a convolutional neural network.

9. The system of claim 6, wherein the neural network is a recurrent neural network.

10. A vehicle comprising:
   a surface-penetrating radar (SPR) system for acquiring SPR images during vehicle travel;
   a computer including a processor and electronically stored instructions, executable by the processor, for analyzing the acquired SPR images and computationally identifying subsurface structures therein by using the acquired image as input to a predictor that has been computationally trained to identify subsurface structures in SPR images; and
   computationally navigating the vehicle based at least in part on the identified subsurface structures and a terrestrial map relating subsurface structures to terrestrial coordinates.

11. The vehicle of claim 10, wherein the computer is configured to associate the recognized features in the images with terrestrial coordinates corresponding to times when the images were obtained.

* * * * *